(12) United States Patent
Kim et al.

(10) Patent No.: US 9,285,910 B2
(45) Date of Patent: Mar. 15, 2016

(54) IN-CELL TYPE TOUCH DISPLAY DEVICE INCLUDING SWITCHING PART AND METHOD OF DRIVING THE SAME

(71) Applicant: LG DISPLAY CO., LTD., Seoul (KR)

(72) Inventors: Gyoung-A Kim, Jeollanam-do (KR); Yoon-Hwan Woo, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/141,942

(22) Filed: Dec. 27, 2013

(65) Prior Publication Data

US 2014/0184543 A1   Jul. 3, 2014

(30) Foreign Application Priority Data

Dec. 28, 2012 (KR) .................. 10-2012-0155963

(51) Int. Cl.
*G06F 3/044* (2006.01)
*G06F 3/041* (2006.01)

(52) U.S. Cl.
CPC .............. *G06F 3/0412* (2013.01); *G06F 3/044* (2013.01); *G06F 3/0416* (2013.01)

(58) Field of Classification Search
CPC .............. H03K 17/955; H03K 17/962; G06F 2203/04107; G06F 2203/04111; G06F 2203/04112; G06F 3/03547; G06F 3/041–3/0416; G06F 3/0488–3/04886; G06F 2200/1634; G06F 2200/0339; G06F 2200/04103; G06F 2200/04104; G06F 1/169–1/1692; G06F 1/1643; G02F 1/13338
See application file for complete search history.

(56) References Cited

U.S. PATENT DOCUMENTS

| | | | |
|---|---|---|---|
| 5,892,493 A | 4/1999 | Enami et al. | |
| 2008/0062140 A1 | 3/2008 | Hotelling et al. | |
| 2010/0194695 A1* | 8/2010 | Hotelling et al. | 345/173 |
| 2010/0194698 A1* | 8/2010 | Hotelling et al. | 345/173 |
| 2012/0056835 A1 | 3/2012 | Choo et al. | |
| 2012/0098776 A1* | 4/2012 | Chen et al. | 345/173 |
| 2012/0113046 A1 | 5/2012 | Akira | |
| 2012/0218482 A1* | 8/2012 | Hwang et al. | 349/12 |
| 2012/0242597 A1 | 9/2012 | Hwang et al. | |

FOREIGN PATENT DOCUMENTS

| | | |
|---|---|---|
| JP | 9-33891 A | 2/1997 |
| JP | 2012-203901 A | 10/2012 |
| KR | 10-2012-0025923 A | 3/2012 |
| KR | 10-1190484 B1 | 10/2012 |
| TW | 201415124 A | 4/2014 |

* cited by examiner

*Primary Examiner* — Sanghyuk Park
(74) *Attorney, Agent, or Firm* — Birch, Stewart, Kolasch & Birch, LLP

(57) ABSTRACT

An in-cell type touch display device includes a panel including a plurality of electrodes, a display driver integrated circuit (IC) and a switching part, the plurality of electrodes being divided into a plurality of groups; and a touch IC generating a touch scan signal and applying the touch scan signal into the switching part, wherein the display driver IC generates a common voltage and applies the common voltage into the switching part, and wherein the switching part applies the common voltage into the plurality of electrodes or sequentially applies the touch scan signal into the electrodes in the plurality of groups according to a driving mode of the panel.

13 Claims, 7 Drawing Sheets

IN-CELL TYPE TOUCH DISPLAY DEVICE INCLUDING SWITCHING PART AND METHOD OF DRIVING THE SAME

The present application claims the priority benefit of Korean Patent Application No. 10-2012-0155963 filed in Republic of Korea on Dec. 28, 2012, which is herein incorporated by reference.

BACKGROUND OF THE INVENTION

1. Technical Field

The present invention relates to a display device, and more particularly, to a in-cell type touch display.

2. Related Art

A touch screen is installed onto an image display device, such as a liquid crystal display (LCD) device, a field emission display (FED) device, a plasma display panel (PDP) and an electroluminescence device (EL). A user touches a touch sensor of the touch screen to input data.

Recently, requirement of an in-cell type touch display device including the touch screen in the image display device is increased for slim portable terminal such as a smart-phone and a tablet PC.

FIG. 1 is a schematic view of the related art in-cell type touch display device.

As shown in FIG. 1, the in-cell type touch display device includes a panel 10 including a plurality of electrodes 11, a display driver integrated circuit (IC) 20 and a touch IC 40. The display driver IC 20 is connected to an outer system (not shown) and controls a gate line and a data line in the panel 10 to drive the panel 10. The touch IC 40 senses a touch input of the panel 10 and includes a plurality of touch ICs 41 and 42. The in-cell type touch display device may be a self-capacitive type. The display driver IC 20 is disposed outside the panel 10 and connects the plurality of electrodes 11 to the touch IC 40.

Referring to FIG. 2, which is a timing chart of signals in a display period and a touch-sensing period according to a sync signal in the related art in-cell type touch display device, a driving method of the related art in-cell type touch display device is explained.

As shown in FIG. 2, the related art in-cell type touch display device is driven in a field sequential method according to a sync signal with a display period and a touch-sensing period in one frame. In addition, the plurality of touch ICs 41 and 42 applies touch-scan signals "Touch IC1" and "Touch IC2" for touch-sensing to the plurality of electrodes in each of n and (n+1)th frames.

SUMMARY OF THE INVENTION

Accordingly, the present invention is directed to an in-cell type touch display device and a method of driving the same that substantially obviates one or more of the problems due to limitations and disadvantages of the related art.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

In accordance with the present invention, as embodied and broadly described herein, an in-cell type touch display device includes a panel including a plurality of electrodes, a display driver integrated circuit (IC) and a switching part, the plurality of electrodes being divided into a plurality of groups; and a touch IC generating a touch scan signal and applying the touch scan signal into the switching part, wherein the display driver IC generates a common voltage and applies the common voltage into the switching part, and wherein the switching part applies the common voltage into the plurality of electrodes or sequentially applies the touch scan signal into the electrodes in the plurality of groups according to a driving mode of the panel.

In the another aspect, a method of driving an in-cell type touch display device including a panel and a touch IC generating a touch scan signal, the panel including a plurality of electrodes, which are divided into a plurality of groups, a display driver IC generating a common voltage, a switching part applying the common voltage or the touch scan signal into the plurality of electrodes, and the touch scan signal from the touch IC is applied into the switching part, the method includes applying the common voltage into the plurality of electrodes when a driving mode of the panel is a display driving mode; and sequentially applying the touch scan signal into the plurality of electrodes in the plurality of groups when the driving mode of the panel is a touch driving mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF PREFERRED EMBODIMENTS

Reference will now be made in detail to the preferred embodiments of the present invention, examples of which are illustrated in the accompanying drawings.

In an in-cell type touch display device of the present invention, a plurality of electrodes are divided into a plurality of groups, and a touch-sensing signals are sequentially applied to the electrodes in each group. For sake of explanation, the electrodes are divided into two or three groups. However, it is not limited thereto, and the electrodes may be divided into at least four groups.

Figure 1:
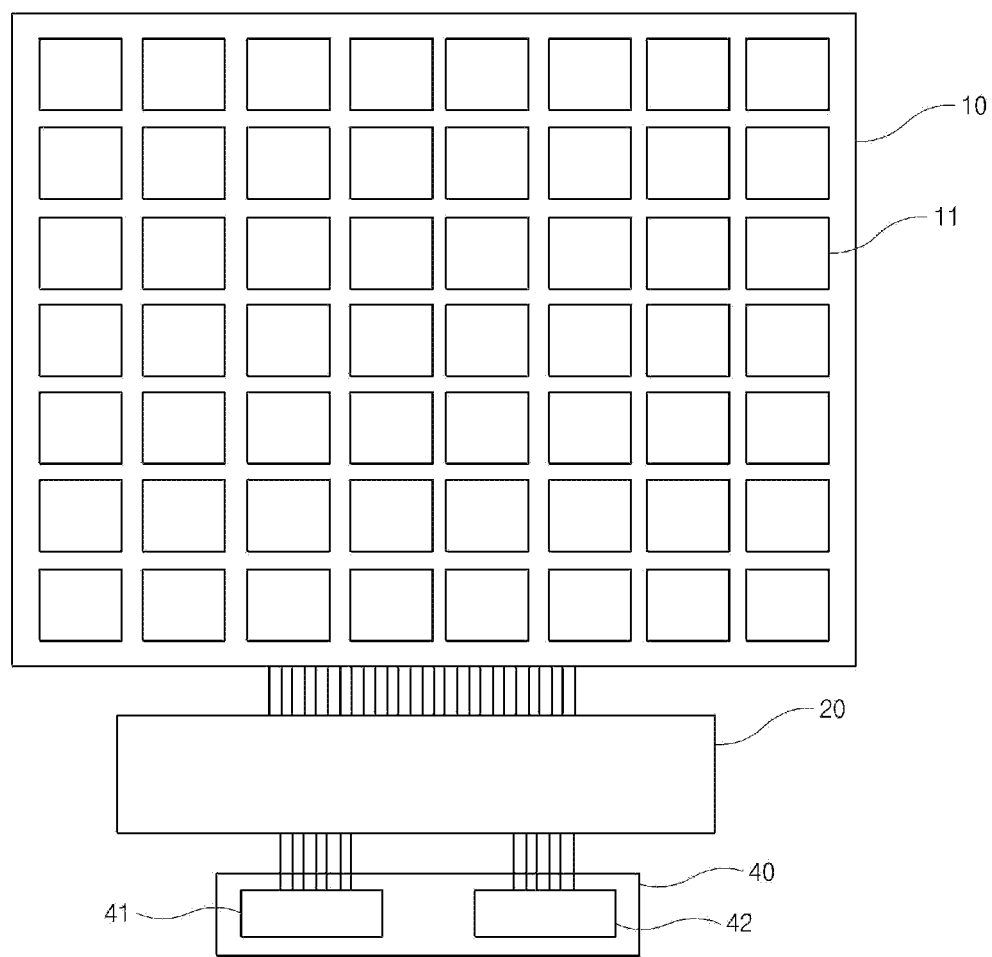
FIG. 1 is a schematic view of the related art in-cell type touch display device.
Figure 2:
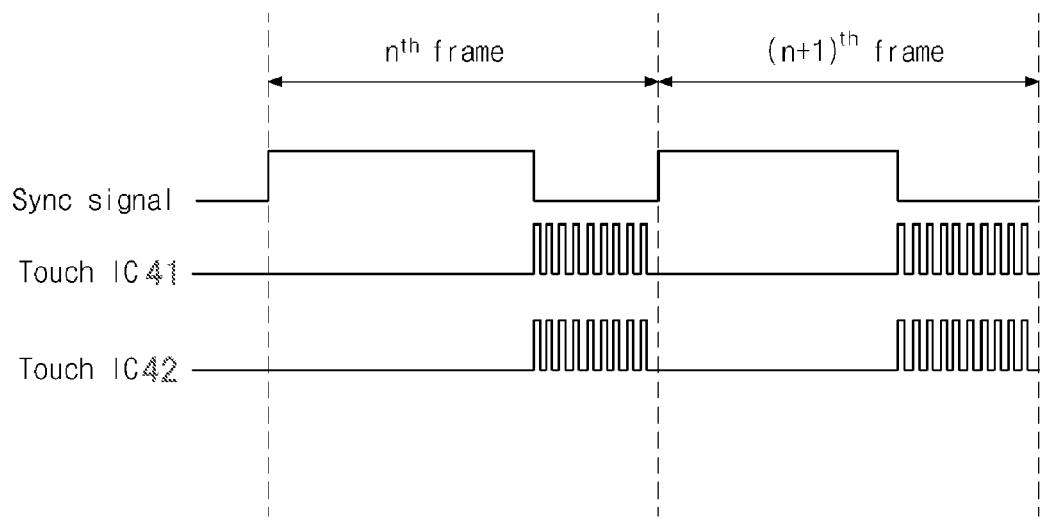
FIG. 2 is a timing chart of signals in a display period and a touch-sensing period according to a sync signal in the related art in-cell type touch display device.
Figure 3:
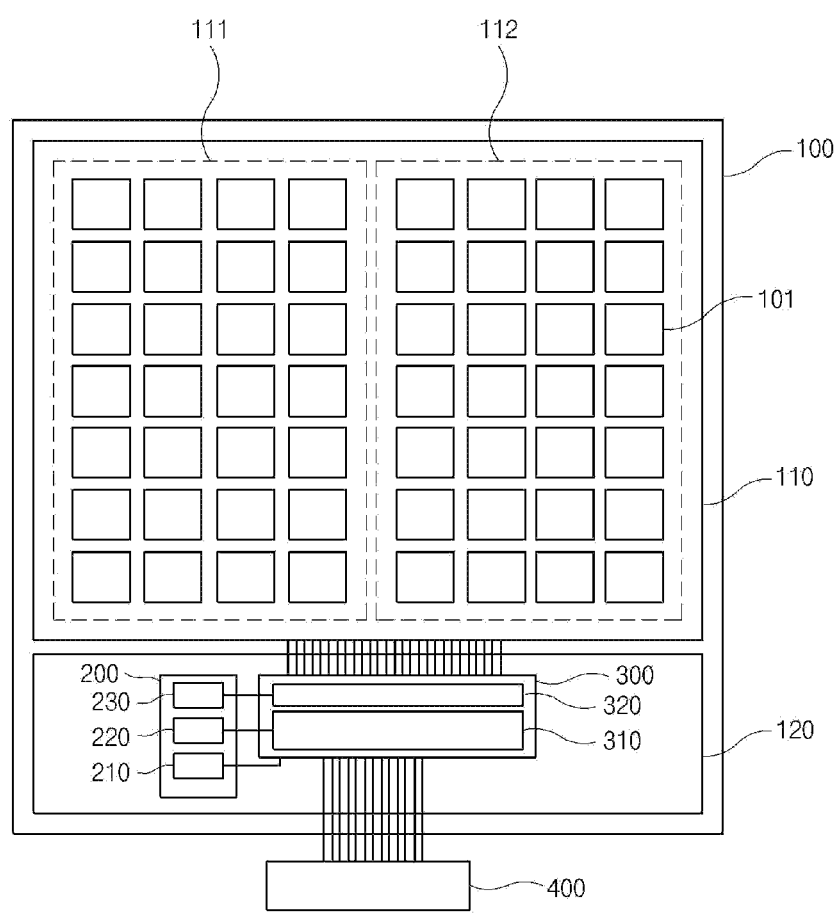
FIG. 3 is a schematic view of an in-cell type touch display device according to a first embodiment of the present invention.
Figure 4:
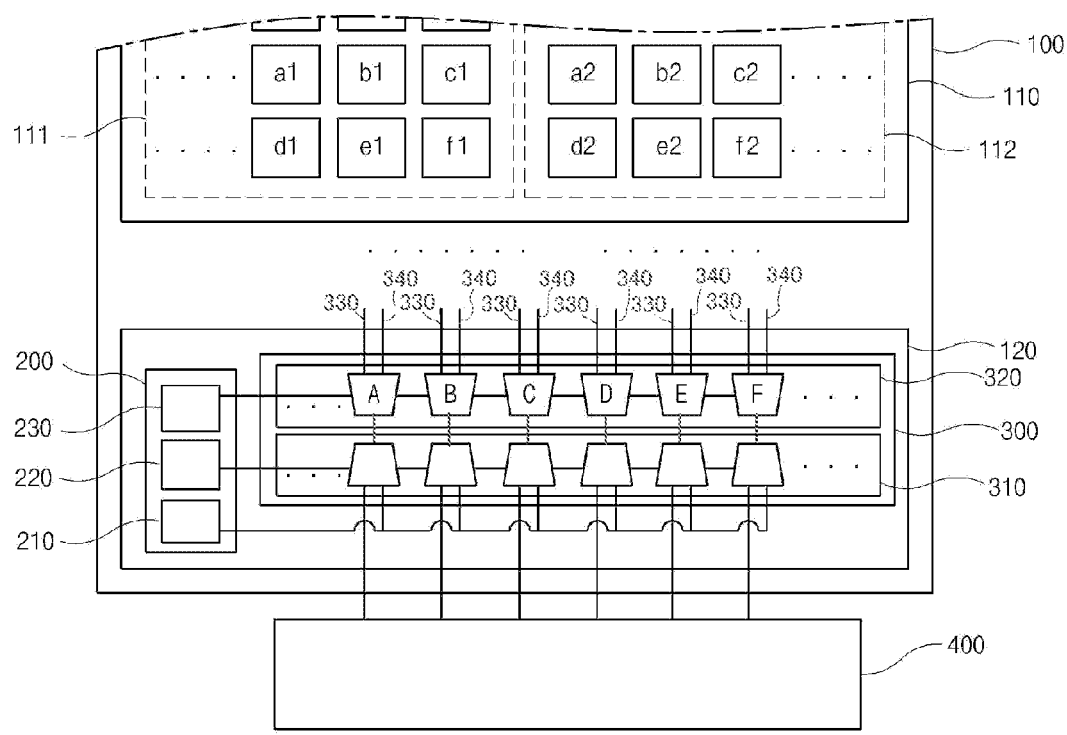
FIG. 4 is a schematic view showing connection of a switching part of an in-cell type touch display device according to the first embodiment of the present invention.
Figure 6:
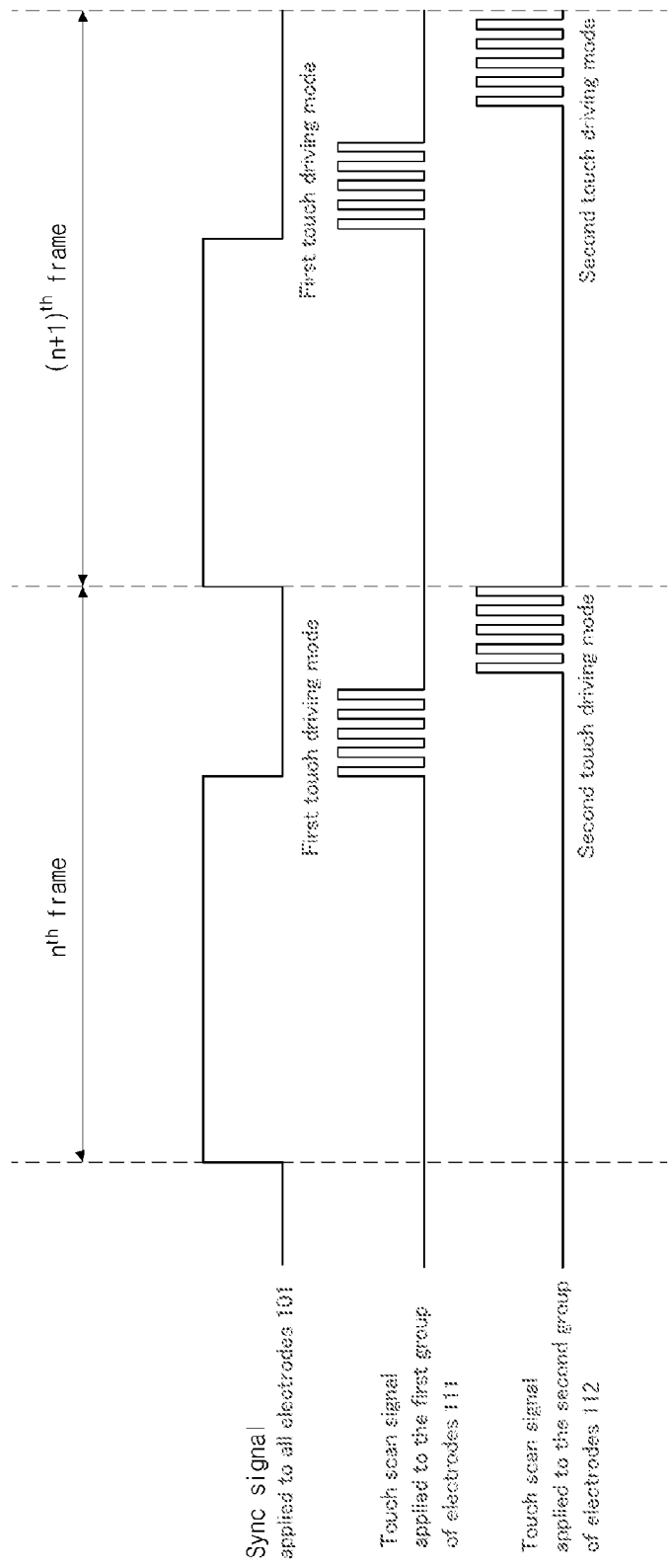
FIG. 6 is a timing chart of signals in a display period and a touch-sensing period according to a sync signal in an in-cell type touch display device according to the first embodiment of the present invention.

With reference to FIGS. 3, 4 and 6, an in-cell type touch display device of the present invention according to a first embodiment of the present invention will be explained.

FIG. 3 is a schematic view of an in-cell type touch display device according to a first embodiment of the present invention, and FIG. 4 is a schematic view showing connection of a switching part of an in-cell type touch display device according to the first embodiment of the present invention. FIG. 6 is a timing chart of signals in a display period and a touch-sensing period according to a sync signal in an in-cell type touch display device according to the first embodiment of the present invention.

As shown in FIG. 3, an in-cell type touch display device includes a panel 100 including a plurality of electrodes 101, which is divided into two groups 111 and 112, a display driver IC 200 and a switching part 300, and a touch IC 400 generating and applying a touch scan signal into the switching part 300. The display driver IC 200 generates and applying a common voltage into the switching part 300. According to a driving mode of the panel 100, the switching part 300 applies the common voltage into the plurality of electrodes 101 or sequentially applies the touch scan signal into the electrodes 101 of the two divided groups 111 and 112.

The panel 100 senses the user's touch position. For example, the panel 100 of the present invention may be an in-cell type touch screen using a self-capacitive principle. The panel 100 includes a display region 110 and a non-display region 120 at a side of the display region 110. The plurality of electrodes 101 is formed at the display region 110, and the display driver IC 200 and the switching part 300 are formed at the non-display region 120. The plurality of electrodes 101 and the switching part 300 are connected to each other by a plurality of lines (not shown).

The display region 110 of the panel 100 may include two substrates (not shown) and a liquid crystal layer (not shown) therebetween. In this instance, a plurality of data lines, a plurality of gate lines, which cross the plurality of data lines to define pixels, a plurality of thin film transistors (TFTs), which are formed at crossing portions of the data lines and the gate lines, a plurality of pixel electrodes for charging data voltages into the pixels. The pixels are arranged in a matrix shape.

In the display region 110 of the panel 100, the plurality of electrodes 101 overlap the plurality of pixel electrodes (not shown). When the panel 100 has a display driving mode, the plurality of electrodes 101 serve as a common electrode to drive the liquid crystal layer with the plurality of pixel electrodes. When the panel 100 has a touch driving mode, the plurality of electrodes 101 serve as a touch electrode for sensing a touch position with a touch scan signal from the touch IC 400.

When the panel 100 has the display driving mode, the display driver IC 200 applies the common voltage into the plurality of electrodes 101. When the panel 100 has the touch driving mode, the switching part 300 sequentially applies the touch scan signal into the electrodes 101 of the two divided groups 111 and 112.

The display driver IC 200 drives the data lines and the gate lines in the panel 100. In addition, the display driver IC 200 drives the plurality of electrodes 101 as the common electrode or the touch electrode. The display driver IC 200 may includes a common voltage generating part 210, a sync signal generating part 220 and a switching control signal generating part 230.

The common voltage generating part 210 generates the common voltage (Vcom). The common voltage from the common voltage generating part 210 is provided into the switching part 300. In other words, when the panel 100 has the display driving mode, the common voltage generating part 210 generates and applies the common voltage into the plurality of electrodes 101 to display an image.

The sync signal generating part 220 generates a sync signal for determining the driving modes of the display panel 100.

For example, when the panel 100 has the display driving mode, the sync signal generating part 220 generates a first sync signal for applying the common voltage (Vcom) from the common voltage generating part 210 into the plurality of electrodes 101 via the switching part 300. When the panel 100 has the touch driving mode, the sync signal generating part 220 generates a second sync signal for sequentially applying the touch scan signal into the electrodes 101 of the two groups 111 and 112.

According to the sync signals from the sync signal generating part 220, the switching control signal generating part 230 generates a first control signal for connecting all of the plurality of electrodes 101 to the common voltage generating part 210 or a second control signal for sequentially connecting the electrodes 101 of the two groups 111 and 112 to the touch IC 400.

For example, when the sync signal generating part 220 generates the first sync signal for the display driving mode, the switching control signal generating part 230 generates the first control signal such that the common voltage from the common voltage generating part 210 is applied to the plurality of electrodes 101. When the sync signal generating part 220 generates the second sync signal for the touch driving mode, the switching control signal generating part 230 generates the second control signal such that the touch scan signal from the touch IC 400 is sequentially applied into the electrodes 101 of the two groups 111 and 112.

The switching part 300 includes a first switching part 310 operated according to the sync signal from the sync signal generating part 220 and a second switching part 320 operated according to the control signal from the switching control signal generating part 230. The first switching part 310 includes a plurality of switches. For example, the switches of the first switching part 310 may be 2:1 multiplexers (MUX). The second switching part 320 includes a plurality of switches. For example, the switches of the second switching part 320 may be 1:2 demultiplexers (DEMUX).

For example, when the sync signal generating part 220 generates the first sync signal for the display driving mode such that the switching control signal generating part 230 generates first control signal according to the first sync signal, the common voltage from the common voltage generating part 210 is applied into the plurality of electrodes 101. When the sync signal generating part 220 generates the second sync signal for the touch driving mode such that the switching control signal generating part 230 generates second control signal according to the second sync signal, the touch scan signal from the touch IC 400 is sequentially applied into the electrodes 101 of the two groups 111 and 112.

In other words, as shown in FIG. 6, when the panel 100 has the display driving mode, the common voltage is applied to all of the electrodes 101. When the panel 100 has the touch driving mode, the touch scan signal for sensing the user's touch are sequentially applied to the electrodes 101 of the first group 111 via first channels 330 of the switches in the second switching part 320 and the electrodes 101 of the second group 112 via second channels 340 of the switches in the second switching part 320. Although not shown in FIG. 6, the common voltage, which is applied in the display driving mode, may be also applied into the electrodes 101 via the first and second channels 330 and 340 of the switches in the second switching part 320.

With reference to FIG. 4, the first and second switching parts 310 and 320 of the switching part 300 are explained in more detail.

As shown in FIG. 4, the first switching part 310 connects the second switching part 320 to the common voltage generating part 210 or the touch IC 400 according to the sync signal of the sync signal generating part 220. Namely, when the sync signal generating part 220 generates the first sync signal for the display driving mode, the second switching part 320 is connected to the common voltage generating part 210 via the first switching part 310. When the sync signal generating part 220 generates the second sync signal for the touch driving mode, the second switching part 320 is connected to the touch IC 400 via the first switching part 310.

With the signals of the switching control signal generating part 230, the second switching part 320 connects the first switching part 310 to all of the plurality of electrodes 101, or the electrodes 101 of the first group 111 and the electrodes 101 of the second group, respectively. In other words, when the sync signal generating part 220 generates the first sync signal for the displaying driving mode, the first switching part 310 is connected to all of the plurality of electrodes 101 via the second switching part 320. When the sync signal generating part 220 generates the second sync signal for the touch driving mode, the first switching part 310 is connected to the electrodes 101 of the first group 111 and the electrodes 101 of the second group 112, respectively via the second switching part 320.

For example, when the sync signal generating part 220 generates the first sync signal for the display driving mode, the switch A in the second switching part 320 is connected to the electrodes a1 and a2 and the switch B in the second switching part 320 is connected to the electrodes b1 and b2 during the display driving mode. In addition, the switch C in the second switching part 320 is connected to the electrodes c1 and c2, and the switch D in the second switching part 320 is connected to the electrodes d1 and d2. Moreover, the switch E in the second switching part 320 is connected to the electrodes e1 and e2, and the switch F in the second switching part 320 is connected to the electrodes f1 and f2.

On the other hand, when the sync signal generating part 220 generates the second sync signal for the touch driving mode, the switches A, B, C, D, E and F in the second switching part 320 are connected to the electrodes a1, b1, c1, d1, e1 and f1 of the first group 111, respectively, and touch scan signals from the touch IC 400 are applied to the electrodes a1, b1, c1, d1, e1 and f1 of the first group 111, respectively, in a first touch driving mode in one frame, i.e., nth frame or (n+1)th frame (n is an integer). Sequentially switches A, B, C, D, E and F are connected to the electrodes a2, b2, c2, d2, e2 and f2 of the second group 112, respectively, and touch scan signals from the touch IC 400 are applied to the electrodes a2, b2, c2, d2, e2 and f2 of the second group 112, respectively, in a second touch driving mode in the one frame.

Referring again to FIG. 3, the touch IC 400 applies the touch scan signal to the plurality of electrodes 101 via the switching part 300 and detects variation of an electrostatic capacitance of the electrodes. As a result, the touch IC 400 senses the user's touch.

For example, the touch IC 400 may include a touch scan signal generating part (not shown) generating the touch scan signal provided to the plurality of electrodes 101 of the panel 100 for sensing the user's touch. The touch scan signal may be a touch driving voltage. The touch driving voltage may be higher than the common voltage provided into the plurality of electrodes 101 for display driving. For example, the touch driving voltage may be a high level voltage being higher than the common voltage as a low level voltage.

In addition, the touch IC 400 may include a touch sensing part (not shown) receiving a touch sensing signal from the plurality of electrodes 101 and calculating the touch coordinates to sense the user's touch. The calculated touch coordinates are provided into a system of the display device such that the touch coordinates are sensed.

Figure 5:
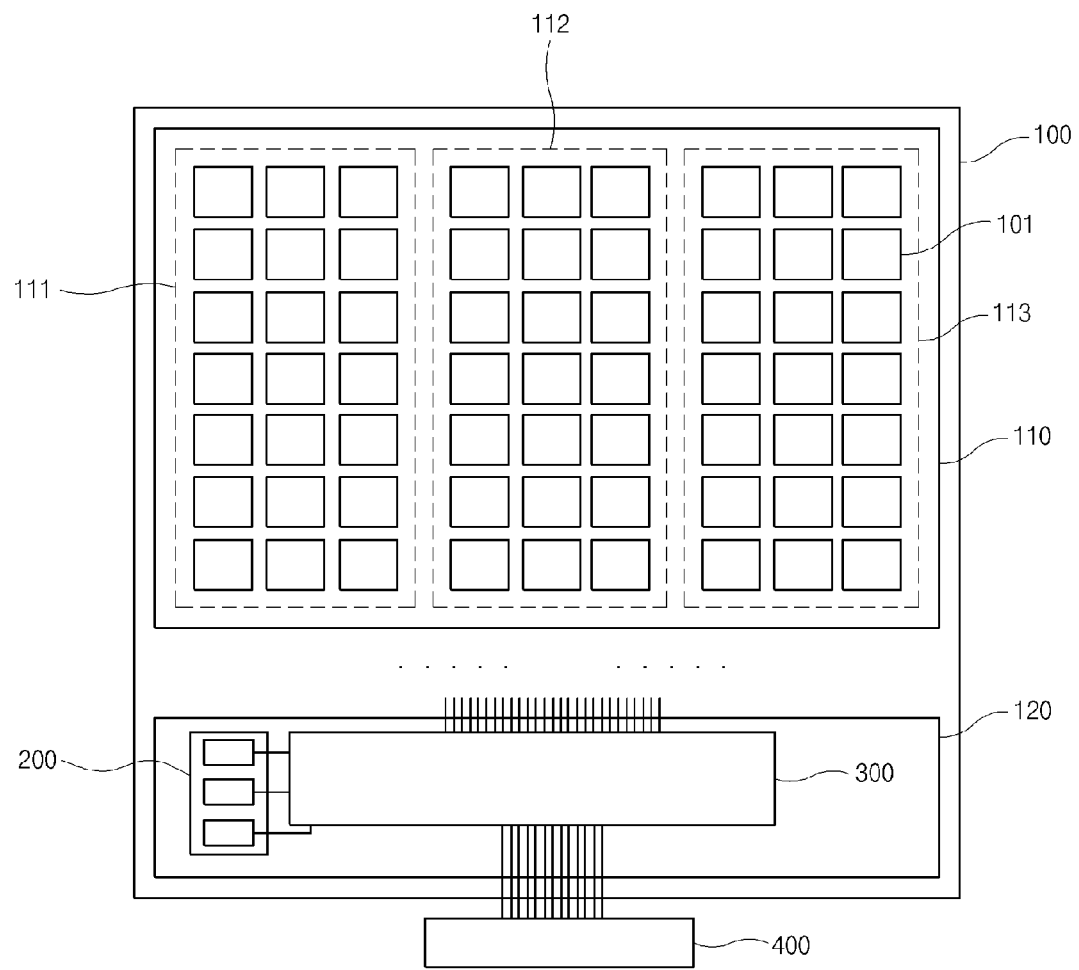
FIG. 5 is a schematic view of an in-cell type touch display device according to a second embodiment of the present invention.
Figure 7:
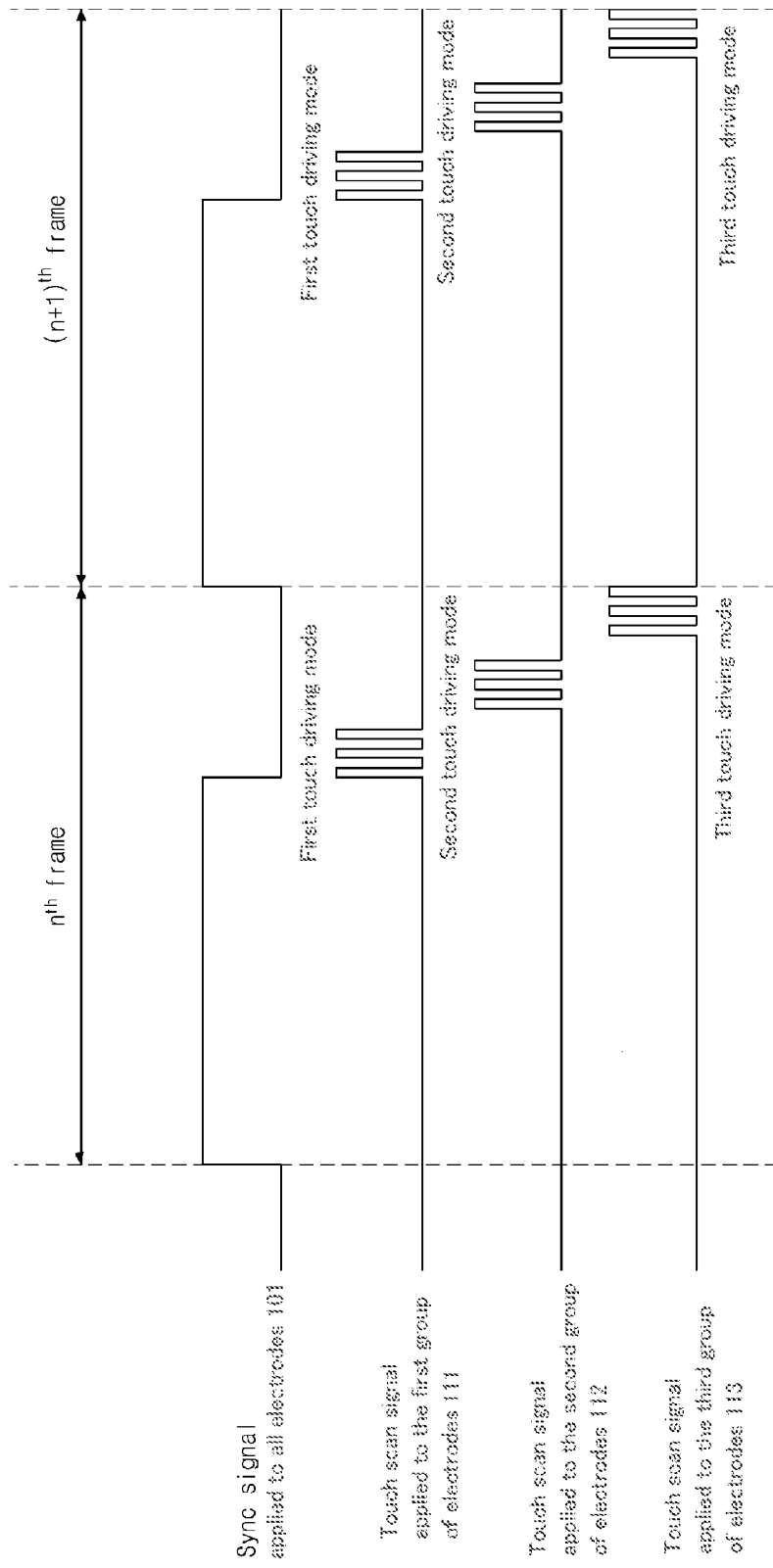
FIG. 7 is a timing chart of signals in a display period and a touch-sensing period according to a sync signal in an in-cell type touch display device according to the second embodiment of the present invention.

With reference to FIGS. 5 and 7, the in-cell type touch display device according to a second embodiment of the present invention is explained below.

FIG. 5 is a schematic view of an in-cell type touch display device according to a second embodiment of the present invention, and FIG. 7 is a timing chart of signals in a display period and a touch-sensing period according to a sync signal in an in-cell type touch display device according to the second embodiment of the present invention. In the second embodiment, each switch in the second switching part 320 has three channels, i.e., first to third channels.

As shown in FIGS. 5 and 7, the switching part 300 applies the common voltage into the plurality of electrodes 101 or sequentially applies the touch scan signal into the electrodes 101 of three divided groups 111, 112 and 113 according to modes of the panel 100.

When the panel 100 has a display driving mode, the common voltage is applied into all of the plurality of electrodes 101. When the panel 100 has a touch driving mode, the touch scan signals from the touch IC 400 are sequentially applied into the electrodes 101 in the first to third groups 111, 112 and 113 via the first and second switching parts 310 and 320 during one frame, i.e., nth frame or (n+1)th frame, respectively. Namely, when the panel 100 has the touch driving mode, the touch scan signal for sensing the user's touch from the touch IC 400 are sequentially applied to the electrodes 101 of the first group 111 via the first channels of the switches in the second switching part 320, the electrodes 101 of the second group 112 via the second channels of the switches in the second switching part 320, and the electrodes 101 of the third group 113 via the third channels of the switches in the second switching part 320 during one frame, i.e., nth frame or (n+1)th frame, respectively.

In other words, when the panel 100 has the display driving mode, the common voltage is applied into all of the plurality of electrodes 101. When the panel 100 has the touch driving mode, the touch sensing signal for sensing the user's touch to the panel 100 is applied into the electrodes 101 in the first group 111 via the first channels of the DEMUXes (switches). In addition, in the touch driving mode, the touch scan signal is applied into the electrodes 101 in the second group 112 via the second channels of the DEMUXes (switches), and the touch scan signal is applied into the electrodes 101 in the third group 113 via the third channels of the DEMUXes (switches).

Although not shown in FIG. 7, the common voltage, which is applied in the display driving mode, may be also applied into all of the electrodes 101 via the first to third channels of the DEMUXes.

The operation of the display driver IC 200 and the switching part 300 of the in-cell type touch display device according to the second embodiment is omitted because it is explained in the first embodiment.

Hereinafter, a driving method of the in-cell type touch display device is explained in more detailed with reference to FIGS. 3 and 4.

The in-cell type touch display device includes the panel and the touch IC. The panel includes the electrodes, which are divided into a plurality of groups, the display driver IC generating the common voltage, and the switching part applying the common voltage or the touch scan signal into the plurality of electrodes. The touch IC generates and applies the touch scan signal into the switching part.

The display driver IC includes a common voltage generating part, a sync signal generating part and a switching control signal generating part. The common voltage generating part generates the common voltage. The sync signal generating part generates a sync signal for determining the driving modes of the display panel. The switching control signal generating part generates a control signal for connecting all of the plurality of electrodes to the common voltage generating part or sequentially connecting the electrodes in the groups and to the touch IC according to the sync signals. The switching part includes a first switching part operated according to the sync signal and a second switching part operated according to the control signal.

When the panel has the display driving mode, the driving method of the in-cell type touch display device of the present invention includes a step of applying the common voltage into the electrodes of the panel.

The step of applying the common voltage to the electrodes of the panel may includes a step of connecting the common voltage generating part with the second switching part when the first switching part receives the sync signal for the display driving mode and a step of connecting the plurality of first switching parts with the electrodes when the plurality of second switching parts receives the control signal according to the sync signal for the displaying driving mode.

On the other hand, when the panel has the touch driving mode, the driving method of the in-cell type touch display device of the present invention includes a step of sequentially applying the touch scan signal into the electrodes in the divided groups.

The step of sequentially applying the touch scan signal into the electrodes in the divided groups may includes a step of connecting the touch IC with the second switching part when the first switching part receives the sync signal for the touch driving mode and a step of sequentially connecting the first switching part with the electrodes in the divided groups when the second switching part receives the control signal according to the sync signal for the touch driving mode.

In the driving method of the in-cell type touch display device, by connecting at least two electrode groups with the switching part, the common voltage or the touch scan signal is applied into the electrodes in the groups via the switching part. The display driver IC and the switching part may be formed in the panel of the in-cell type touch display device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An in-cell type touch display device, comprising:
a panel including a plurality of electrodes, a display driver integrated circuit (IC) and a switching part, the plurality of electrodes being divided into a plurality of groups; and
a touch IC generating a touch scan signal and applying the touch scan signal to the switching part,
wherein the display driver IC generates a common voltage and applies the common voltage to the switching part,
wherein the switching part applies the common voltage to the plurality of electrodes when a driving mode of the panel is a display driving mode, and sequentially applies the touch scan signal to the electrodes in the plurality of groups with respect to each group when a driving mode of the panel is a touch driving mode,
wherein the plurality of groups includes a first group and a second group,
wherein the touch driving mode includes a first touch driving mode and a second touch driving mode next to the first touch driving mode,
wherein the switching part sequentially applies the touch scan signal to the electrodes in the first group when a driving mode of the panel is the first touch driving mode, and sequentially applies the touch scan signal to the electrodes in the second group when a driving mode of the panel is the second touch driving mode,
wherein the display driver IC is configured to:
generate a sync signal for the driving mode of the panel,
generate a control signal for supplying the common voltage to the plurality of electrodes when the sync signal is a first sync signal for the display driving mode, and
sequentially connect the electrodes in the plurality of groups with the touch IC when the sync signal is a second sync signal for the touch driving mode, and
wherein the touch IC detects a self-capacitive type variation of an electrostatic capacitance of each of the plurality of electrodes.

2. The in-cell type touch display device according to claim 1, wherein the panel is divided into a display region and a non-display region, and wherein the plurality of electrodes are formed in the display region, and the display driver IC and the switching part are formed in the non-display region.

3. The in-cell type touch display device according to claim 1, wherein the plurality of electrodes serve as a common electrode when the driving mode of the panel is the display driving mode, and each of the plurality of electrodes serves as a touch electrode when the driving mode of the panel is the touch driving mode.

4. The in-cell type touch display device according to claim 1, wherein the switching part includes a first switching part operating according to the sync signal and a second switching part operating according to the control signal.

5. The in-cell type touch display device according to claim 4, wherein the first switching part is connected to the common voltage generating part and the touch IC,
wherein the first switching part connects the common voltage generating part with the second switching part when the sync signal is the first sync signal for the display driving mode, and the first switching part connects the touch IC with the second switching part when the sync signal is the second sync signal for the touch driving mode,
wherein the second switching part is connected to the first switching part and one electrode of each group, and
wherein the second switching part connects the first switching part with the electrodes when the sync signal is the first sync signal, and the second switching part sequentially connects the first switching part with the electrodes in the plurality of groups when the sync signal is the second sync signal.

6. The in-cell type touch display device according to claim 4, wherein the first switching part includes a plurality of 2:1 MUXes.

7. The device according to claim 1, wherein the plurality of electrodes and the switching part are directly connected to each other by a plurality of lines.

8. The device according to claim 1, wherein in the first touch driving mode, the switching part does not apply the touch scan signal to the electrodes in the second group while sequentially applying the touch scan signal to the electrodes in the first group, and
  wherein in the second touch driving mode, the switching part does not apply the touch scan signal to the electrodes in the first group while sequentially applying the touch scan signal to the electrodes in the second group.

9. A method of driving an in-cell type touch display device including a panel and a touch IC generating a touch scan signal, the panel including a plurality of electrodes divided into a plurality of groups, a display driver IC generating a common voltage, and a switching part applying the common voltage or the touch scan signal into the plurality of electrodes, the touch IC applying the touch scan signal to the switching part, the method comprising:
  applying the common voltage to the plurality of electrodes when a driving mode of the panel is a display driving mode; and
  sequentially applying the touch scan signal to the plurality of electrodes in the plurality of groups with respect to each group when the driving mode of the panel is a touch driving mode,
  wherein the plurality of groups includes a first group and a second group,
  wherein the touch driving mode includes a first touch driving mode and a second touch driving mode next to the first touch driving mode, and
  wherein the sequentially applying the touch scan signal to the plurality of electrodes in the plurality of groups includes:
    sequentially applying the touch scan signal to the electrodes in the first group when a driving mode of the panel is the first touch driving mode; and
    sequentially applying the touch scan signal to the electrodes in the second group when a driving mode of the panel is the second touch driving mode,
  wherein the display driver IC is configured to:
    generate a sync signal for the driving mode of the panel,
    generate a control signal for supplying the common voltage to the plurality of electrodes when the sync signal is a first sync signal for the display driving mode, and
    sequentially connect the electrodes in the plurality of groups with the touch IC when the sync signal is a second sync signal for the touch driving mode, and
  wherein the touch IC detects a self-capacitive type variation of an electrostatic capacitance of each of the plurality of electrodes.

10. The method according claim 9, wherein the switching part includes a first switching part operating according to the sync signal and a second switching part operating according to the control signal, and
  wherein the applying the common voltage to the plurality of electrodes includes:
    connecting the common voltage generating part with the second switching part when the first switching part receives the first sync signal for the display driving mode; and
    connecting the first switching part with the electrodes when the second switching part receives the first sync signal for the display driving mode.

11. The method according claim 9, wherein the switching part includes a first switching part operating according to the sync signal and a second switching part operating according to the control signal, and
  wherein the sequentially applying the touch scan signal to the plurality of electrodes in the plurality of groups includes:
    connecting the touch IC with the second switching part when the first switching part receives the second sync signal for the touch driving mode; and
    sequentially connecting the first switching part with the plurality of electrodes in the plurality of groups when the second switching part receives the control signal according to the second sync signal for the touch driving mode.

12. The method according to claim 9, wherein in the first touch driving mode, the touch scan signal is not applied to the electrodes in the second group while the touch scan signal is sequentially applied to the electrodes in the first group, and
  wherein in the second touch driving mode, the touch scan signal is not to the electrodes in the first group while the touch scan signal is sequentially applied to the electrodes in the second group.

13. An in-cell type touch display device, comprising:
  a panel including a plurality of electrodes, a display driver integrated circuit (IC) and a switching part, the plurality of electrodes being divided into a plurality of groups including a first group of electrodes and a second group of electrodes; and
  a touch IC generating a touch scan signal and applying the touch scan signal to the switching part,
  wherein the display driver IC generates a common voltage and applies the common voltage to the switching part,
  wherein the switching part applies the common voltage to the plurality of electrodes when a driving mode of the panel is a display driving mode, and sequentially applies the touch scan signal to the electrodes in the plurality of groups with respect to each group when a driving mode of the panel is a touch driving mode,
  wherein the touch driving mode includes a first touch driving mode and a second touch driving mode next to the first touch driving mode,
  wherein the switching part sequentially applies the touch scan signal to the electrodes in the first group when a driving mode of the panel is the first touch driving mode, and sequentially applies the touch scan signal to the electrodes in the second group when a driving mode of the panel is the second touch driving mode, such that the touch scan signal is applied to all the electrodes of the panel in the touch driving mode mode,
  wherein the in-cell type touch display device is a self-capacitive type in which each of all the plurality of electrodes serves as a touch electrode when the driving mode of the panel is the touch driving mode.

* * * * *